INVENTORS
Donald L. Klass
BY   John J. Azukas
ATTYS.

United States Patent Office 3,809,615
Patented May 7, 1974

3,809,615
METHOD AND MEANS FOR NATURAL
GAS DETECTION
Donald Leroy Klass, 21 E. Scott Road, Barrington, Ill. 60010, and John Joseph Azukas, 4421 Prescott, Lyons, Ill. 60534
Continuation-in-part of abandoned application Ser. No. 831,000, June 6, 1969. This application Jan. 10, 1972, Ser. No. 216,810
Int. Cl. G01n 31/14
U.S. Cl. 195—103.5 R                                         9 Claims

ABSTRACT OF THE DISCLOSURE

Method and apparatus for detecting the presence of ambient gaseous light paraffins with an immobilized enzyme system fraction collected from microorganisms which can oxidize $C_1$–$C_4$ hydrocarbons. An immobilized enzyme system separated from a methane-obligate microorganism can be used to advantage for identifying methane in natural gas. A detection means is associated with the method and apparatus which is sensitive to a response of the separated enzyme system fraction to the presence of the gaseous hydrocarbons.

This invention relates to a method and apparatus for detecting gaseous hydrocarbons in which the hydrocarbon utilizing property of separated enzyme fractions from methane obligate microorganisms is used in association with a detection means. This application is a continuation-in-part of Ser. No. 831,000, filed June 6, 1969, now abandoned, by the same applicants.

The art has recognized that certain microorganisms possess the attribute of utilizing hydrocarbons. The hydrocarbon is metabolized by the microorganisms and oxidized to presumably provide an energy and nutrient source for the microorganisms. Reference may also be made to hydrocarbon-oxidizing microorganisms because of oxygen uptake as the hydrocarbon is utilized. Such utilization is accompanied by production of carbon dioxide, and such intake of oxygen and production of carbon dioxide further establishes that such microorganisms do indeed metabolize the hydrocarbons as an energy food source.

A great number of genera, and even greater number of species, have been recognized in the art as being hydrocarbon-utilizing microorganisms. A taxonomic list of such hydrocarbon-utilizing microorganisms is presented, for example, in Beerstecher's Petroleum Microbiology, Houston, Elsevier Press, 1954.

The hydrocarbon-utilizing property of various microorganisms has been recognized in the art as a possibly useful tool for various purposes. For example, a process has been disclosed for removal of straight chain hydrocarbons from petroleum fractions by using such microorganisms in U.S. Pat. 3,268,414. In this patent a variety of yeast and bacteria are disclosed for such purposes; the yeast including representatives from the genus Candida, Torulopsis, Mycoderma and others. The bacteria employed are selected from genera including Bacillus, Pseudomonas, Nocardia, Micrococcus and others.

This hydrocarbon utilizing property of the microorganisms has also been used as a tool in an attempt to produce a high protein composition by cell growth of the microorganisms, one example of which is disclosed in U.S. Pat. No. 3,308,035. The microorganisms disclosed in this patent were selected from genera including Pseudomonas, Alcaligenes, Cellulomonas, Brevibacterium and Corynebacterium. Various hydrocarbon-utilizing species were also used as an aid for locating subterranean deposits of petroleum as disclosed in U.S. Pat. No. 3,033,761.

In acordance with the teachings of the present invention, detection of ambient gaseous natural gas is provided by using a sensitive, highly responsive separated enzyme system fraction from microorganisms known to oxidize light paraffins of natural gas, that is, $C_1$–$C_4$ hydrocarbons. Such a separated fraction may operate as a detector, monitor, dosimeter, or preferably to activate a readily detectable alarm means to provide a warning alarm. The term "ambient" is used to indicate the surroundings in which the detection will occur. This may be on, below or above ground level. It is particularly desirable to detect the presence of gaseous methane in natural gas, in various environments such as the home, industrial areas, mining operations, research areas, and still other environments which will occur to practitioners. It follows that it would be desirable to provide an effective detection means once this area of use has been recognized. Such effective detection means should desirably report the presence of the ambient gaseous methane by some visual or audible means.

Methane is widely distributed and widely used in different residential, industrial and research applications. It is understandable that this undetected presence is likely to result in hazards of fire, explosion and toxicity. It will be further desirable to utilize enzyme systems from methane-obligate microorganisms to particularly identify the presence of methane, the principal constituent of natural gas.

It will be appreciated that a highly sensitive fraction collected from specific microorganisms which uniquely utilize methane would be welcome for detecting the presence of gaseous methane to extend the tools available to practitioners for this purpose. It will also be appreciated that such a fraction would be particularly welcome when it exhibits greater sensitivity in detecting the environmental gaseous methane.

In accordance with the above, it is one object of the invention to provide an improved method and apparatus by which natural gas is detected and quickly reported.

Another object of the invention is to provide a method and apparatus in which a sensitive and quickly responsive enzyme system fraction from methane-obligate microorganisms is used to actuate an alarm means which visually or audibly reports the presence of natural gas before hazardous ambient levels are attained.

The above objects are further characterized by using the methane obligate enzyme fraction to actuate visual detection means such as color formation and color changes to report the presence of the hydrocarbon gases. Another included feature is to use such enzyme separated fractions in association with a gas permeable membrane so that the hydrocarbon gases and oxygen can permeate the membrane and contact the enzyme fraction to actuate said detection means.

Objects such as the foregoing are attained by the present invention which will now be disclosed in detail. Reference in such disclosure will also be made to the accompanying drawings wherein.

The enzyme system fraction is separated from a methane obligate microorganism dispersed in nutrient media comprising conventional nutrient mixtures. The enzyme fraction active for methane oxidation is variously separated, and is then supported by a carrier having access means to provide a contact with ambient gaseous methane.

The enzyme system is associated with a carrier in the presence of a detection means such as a pH or oxidation change color indicator. The enzyme system is preferably immobilized by physical entrapment or chemical binding on a carrier, such as paper. This allows greater versatility for handling storage and places of use. The enzyme system fraction also can be expected to remain active for longer periods than microorganisms, which may die. The enzyme system may be separated by several methods involving separating ruptured cell debris from the enzymes of a hydrocarbon-utilizing microorganism culture, as by centrifugation. The enzyme system fraction may be in cell-free particulates, the solution, or both. For example, the enzyme activity of *Methylococcus capsulatus* is found substantially only in the particulate fraction.

Figure 1:
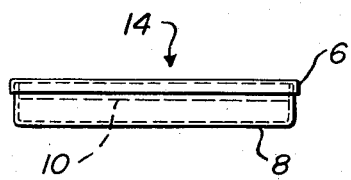
FIG. 1 is a side elevational view of one carrier which is useful to support the hydrocarbon utilizing enzyme fractions and a detection means.
Figure 2:
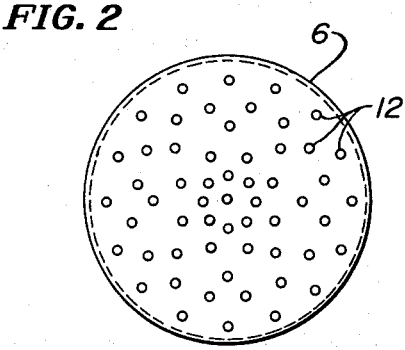
FIG. 2 is a top plan view of the carrier of FIG. 1 showing access means for the gaseous hydrocarbons to contact the mixture of hydrocarbon utilizing enzyme fractions and detecting means.

Referring first to the drawings, various embodiments of the apparatus are shown by which the present method may be practiced. In FIG. 1 the carrier is shown as a conventional petri dish having a cover 6 closing the open top of a dish 8. Inside the dish is a dispersion 10 which includes the substantially immobilized enzyme system in a nutrient medium in a solid or semi-solid form. Access means are provided in said carrier or container to allow any gaseous methane to contact the dispersion deposited within the container. Such access means are shown herein as a plurality of communicating apertures, passageways or air-vent holes shown collectively at 12 in FIG. 2. The dispersion 10 in the embodiments of FIGS. 1 and 2 is intended to include a visual detection means such as a pH color indicator which assumes a characteristic color change in the presence of sufficient levels of acidity developed as a metabolic byproduct following reaction between the enzyme system fraction and the gaseous methane.

Figure 3:
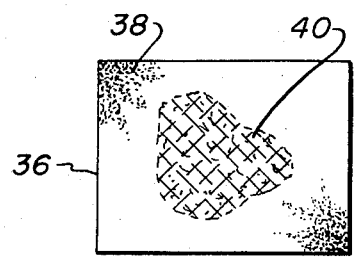
FIG. 3 is a plan view of another carrier useful for supporting a dispersion of a separated enzyme fraction admixed with a visual detection means.

An alternative carrier is shown in FIG. 3 as being a body 36 having an adsorbent surface 38 on which is deposited an immobilized dispersion schematically indicated at 40. The body may be paper of laboratory filter paper grade and the dispersion may be the dry residue following impregnation of the paper by the enzyme system fraction derived from hydrocarbon utilizing microorganisms. A visual color indicator is admixed in such dispersions, so that such dispersion assumes a characteristic color change in the presence of ambient gaseous hydrocarbons. The entire surface of the paper may be covered with the liquid dispersion by immersing the paper in a liquid dispersion. In this way the paper carrier operates somewhat in the nature of litmus paper which reports a pH condition by characteristic change in the color of the paper. If moisture is required for a particular color indicator to operate, then the carrier of FIG. 3 may repose in a high moisture environment to provide the proper conditions for reporting the presence of gaseous hydrocarbon.

Figure 4:
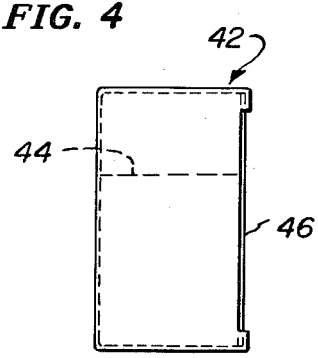
FIG. 4 is a somewhat diagrammatic elevational view of still another carrier which is enclosed partly with a gas-permeable membrane.

Still another carrier is schematically illustrated in the view of FIG. 4 in which said carrier is in the form of a container 42 which is enclosed. The dispersion 44 with the enzyme system is deposited within the enclosed container as a liquid solution or dispersion, as an agar gel, or in still other forms. The gel or another substantially solid forms are preferred because of desired immobilization of the enzyme system fraction. One portion or wall of the enclosure is provided as a gas-permeable membrane 46, which is fastened or bonded to substantially rigid wall parts of the container. The membrane, for example, may be a silicone rubber which provides ingress to methane gas and oxygen and provides egress to carbon dioxide produced by the methane obligate microorganism in the dispersion. The membrane 46 holds the dispersion 44 within the enclosed container 42, and such dispersion is introduced into the container through a stoppered part or the like which, however, is not shown.

Use of the term "natural gas" here shall collectively include the light paraffins, or $C_1$-$C_4$ hydrocarbons which can be found in natural gas. The methane-obligate enzyme systems are used to advantage for detecting methane, but other enzyme systems may be used to detect the other light paraffins, namely, ethane, propane and butane. Such enzyme systems may be obtained from microorganisms known to have such functions, including *Mycobacterium methanicum* n. sp., *Streptomyces*, *Mycobacterium paraffinicum* n. sp., *M. carbonotophila*, and still others.

The preferred enzyme system fraction used is specific for methane because it is separated from methane obligate organisms such as *Methanomonas methanooxidans*, *Methylococcus capsulatus* and *Pseudomonas methanica*. Such specific or obligate microorganisms, therefore, allow the detection system to identify the hydrocarbon gas as well as to report its presence. The methane obligate microorganisms are cultured in well known nutrient media which usually include nutrient mineral salts such as ammonium chloride, potassium dihydrogen-phosphate, sodium monohydrogenphosphate, ammonium mono- and dihydrogenphosphates, calcium chloride, magnesium sulfate, ferric sulfate, zinc sulfate and hydrated salts such as sulfates of copper, manganese, cobalt, molybdenum and boron. Such salts are dissolved usually in distilled water at about a neutral pH. Such a buffered mineral salt medium may be used in the liquid form or a nutrient agar can be prepared by adding agar in about one-three percent by weight to the liquid buffered mineral salt medium. Cofactors or growth factors may be beneficial when added to the medium.

The immobilized or insolubilized enzyme system fraction is of particular importance in the present invention. Such enzyme systems retain their activity for longer periods compared to native soluble enzymes. The immobilized form is far less susceptible to oxidation and denaturization by heat extremes of pH. In particular, the solid supported enzymes may be recovered from a reacting mixture by conventional techniques for separating solids and liquids.

The enzyme may be immobilized or insolubilized in a variety of ways. One way is inclusion in a matrix as by entrapment within the lattice of gels such as polyacrylamide and starch gels, as well as formation of collagen-enzyme complexes. Use of physical carriers for adsorption may be used to provide another way, such as paper, polymers, cellulose, and the like. Another way is covalent bonding to a water-insoluble carrier, such as bind the protein of the enzyme to a polymer chain. Still another way is chemical cross-linking of the protein by a bifunctional reagent.

Various known color indicators sensitive to pH changes may be added to the carrier. The color indicator may also be of the redox type which indicates changes in oxidation levels. In addition to the color change of the indicator, the intensity of the color may also be altered at higher pH or oxidation levels. The intensity of the color will understandably provide some semi-quantitative concepts of the amount of methane gas in the environment. Another way of assessing a quantitative idea of the amount of the hydrocarbon gas to employ conventional colorimeters which measure the intensity of the deveolped color.

The carriers which use a gas permeable membrane as part of the enclosure lead to a desirable apparatus in the practice of the method. As mentioned, such gas permeable membranes may be the silicone rubber type which are provided, for example, by the General Electric Company under their trade designation of "Permselective Membranes." These membranes are generally referred to as dimethyl silicone membranes. Another type of silicone rubber membrane provided by the General Electric Company is available under the trade designation MEM 213 and comprises a silicone-poly-carbonate copolymer. Such membranes are permeable to oxygen, carbon dioxide and methane. Other types of permeable membranes are also operable such as thin natural or synthetic rubber membranes and various Teflon membranes. Representative membranes in this group include fluorinated ethylene propylene resin available under the trade designation TFE Teflon which is polytetrafluoroethylene. Other polymers may be used to obtain the gas permeable membrane such as polyethylene, polypropylene, nylon and still others. Such gas permeable membranes may comprise the entire enclosed container, and may be in the form of an envelope. The gas permeable membrane may also be only a part of the enclosure such as the wall or sheet 46 in the view of FIG. 4. Such a wall or sheet may be bonded or fastened to entirely close an opening within the enclosure.

The enzyme system fraction collected from the light paraffin utilizing microorganism is employed as the biological material which is sensitive to the presence of natural gas, and which responds thereto to quickly report the presence of the light paraffin before hazardous levels are reached. "Hazardous levels" will be readily recognized by practitioners, particularly, at levels which could result in dangerous fires, explosion or toxic animal effects. The enzyme system fraction is supported by a carrier such as gas permeable envelope membrane, a petri dish, a carrier with an adsorbent surface, or other carriers having access means to provide contact of the dispersion with the ambient gaseous hydrocarbons. A substantially solid form of carrier is preferred so that the enzyme system is immobilized thereon or therein.

The following examples are present to teach representative embodiments of practicing the invention, but it should be understood that such examples are only illustrative and are not intended as exclusive teaching.

EXAMPLE 1

Agar—nutrient medium

A liquid nutrient salt medium is prepared by dissolving the following salts inthe amounts listed in one liter of distilled water. The pH of the medium is adjusted to 6.9 with dilute hydrochloric acid.

| Salt: | Grams |
|---|---|
| $KNO_3$ | 1.0 |
| $K_2HPO_4.3H_2O$ | 0.5 |
| $MgSO_4.7H_2O$ | 0.2 |
| $FeCl_3.6H_2O$ | 0.05 |
| $CaCl_2$ | 0.001 |

A culture of *Methylococcus capsulatus* is grown by adding one mililiter of an active suspension of the microorganism thereto. The harvested cells are suspended and disintegrated in 5 volumes of a 20 mM. $KH_2PO_4$ and 10 mM. $MgSO_4$ solution, pH 7.2, in a French press. The extracts are sequentially centrifuged at 3000 g. for 10 minutes, and 100,000 g. for 60 minutes. The last particulate fraction is collected as a cell-free enzyme fraction.

EXAMPLE 2

Enzyme fraction in gas permeable membrane 1.5 g. of *Pseudomonas methanica* is added to 50 cc. of water. This is treated with 45 g. of 3 mm. Pyrex glass beads. The resulting mixture is then subjected to high speed agitation with a Serval Omni-Mixer at 5° C. for five minutes. Cell-free particulate and liquid fractions are separated by centrifugation at 25,000 g. for 10 minutes. The cell-free extract is adjusted to a pH of 6.9 with dilute hydrochloric acid, and is then adjusted to a pH of 6.9 with dilute hydrochloric acid. To this liquid volume are added three drops of a standard methyl red indicator solution. The resultng liquid assumes a yellow color and this liquid is then encapsulated in a natural rubber membrane envelope having dimensions of 5 cm. x 5 cm. x 3 cm. The envelope is supported by a rigid frame which is then suspended in an atmospheric environment contining methane. As uptake of methane and oxygen occurs, the color of the dispersion medium changes from yellow to red to indicate the presence of such acid.

EXAMPLE 3

Enzyme fraction on paper carrier

The procedure described in Example 1 or 2 is generally followed to prepare an enzyme system fraction from the microorganism, *Methanomonas methanooxidans*. A redox dye is then added to the separated enzyme fraction with mixing. The dispersion of the enzyme system in the solution is immobilized by being impregnated on filter grade paper and then dried. The paper with the dried dispersion is then exposed to an environment containing methane gas, whereupon a color change on the adsorbent surface of the carrier reports the presence of said methane gas.

EXAMPLE 4

Enzyme fraction

A culture of methane obligate *Pseudomonas methanica* is concentrated in a refrigerated centrifuge operating at 25,000 g. for 10 minutes. One gram wet weight of the cells is suspended in a 5 ml. water solution containing 100 millimoles of cysteine as a preservative. The suspension is cooled to 0° C. and then sonicated for 2 minutes by an output of 25 kilocycles per second from a 600 watt Mullard megnetostrictor oscillator. The enzyme fraction is separated from the cell debris by centrifugation and upgraded by column chromatography.

EXAMPLE 5

Enzyme fraction in gas permeable bag

A 100 cc. enzyme fraction or extract, obtained by the procedures of Example 4, is mixed with 50 mg. of brom thymol blue and 50 mg. of brom cresol purple indicators. The pH is adjusted to 7.0. The purple preparation is placed in a rubber gas permeable membrane which is then mounted in a rigid frame support. The major portion of the bag surface area is accessible to gases in the frame support. As ambient methane and oxygen permeates the bag, the purple color turns yellow to report the presence of the methane.

EXAMPLE 6

Dried enzyme fraction on carrier

A 50 cc. enzyme fraction or extract, obtained by the procedure of Example 4, is mixed with 50 mg. of brom cresol purple and the pH of the mixture is adjusted to 7.0. A strip of filter paper is impregnated with the enzyme fraction mixture and then air dried to provide the desired immobilized form. The paper carrier is placed in a methane-containing atmosphere, whereupon the purple color on the paper turns to yellow to report the presence of the methane.

EXAMPLE 7

Enzyme fraction in agar carrier, immobilized

A 50 cc. enzyme fraction or extract, obtained by the procedures of Example 4, is mixed with a solution containing 2.0 g. grams of agar and 50 mg. of brom cresol purple in 50 cc. of water. The pH is adjusted to 7.0. The mixture is solidified in a petri dish to immobilize the enzyme system fraction, and the petri dish is then placed in a methane-containing environment. The solidified mixture turns from purple to yellow to report the presence of the methane.

EXAMPLE 8

Enzyme fraction in polymer carrier

A 100 cc. enzyme fraction or extract, obtained by the procedures of Example 4 is mixed with 50 mg. of brom cresol purple. The pH is adjusted to 7.0, and in this mixture is dissolved 8 g. of acrylamide monomer to provide an immobilized form. Polymerization is induced by addition of 1 cc. of a 10% solution of 2-dimethylaminoethyl cyanide and 1 cc. of a 10% solution of ammonium persulfate. The resulting polymer has a purple color which turns yellow in a methane-containing environment to report the presence of methane.

EXAMPLE 9

Enzyme fraction and light absorption detection

A 0.6 cc. enzyme fraction or extract, obtained by the procedures of Example 4, is added to 8.8 cc. of 0.1 M phosphate buffer, pH 7.0. To the solution is added 0.6 cc. of 0.2% reduced triphosphopyridienenucleotide (TPN-H). A sample is deposited in an enclosed carrier with gas-permeable membranes composing parts thereof. The carrier is placed in the light path at a wave length of 340 mM. The carrier in the light path is placed in a methane containing environment, and the disappearance of absorbance at said 340 mM reports the presence of methane.

An alternative practice provides that diphosphopyridinenucleotide (DPNH), is added to the foregoing solution in place of TPN-H, whereup light absorption increases at the selected wave length as DPNH is oxidized to DPN.

The redox dye used in in the foregoing examples indicates the state of oxidation by its color, and a variety of such redox dyes are available such as the indigo sulfonates, methylene blue, the indophenols and the like. The color indicators used in the foregoing examples may be selected from a wide list of synthetic or vegetable indicators. Characteristic colors on the acid side include methyl green (green-yellow); fuschsin (yellow)); brilliant yellow (blue); Congo red (blue); methyl orange (orange); methyl red (red); and many others. It will be appreciated that the practitioner may readily adapt the methods and the apparatus disclosed to establish time response, alarm means and enzyme systems. It will also be appreciated that the method and apparatus may be likewise adapted to semi-quantitative or quantitative assessments of the amount of methane in the environment relative by indirect measurements of color development through colorimetric measurements, use of a pH range, and the like.

The invention may now be practiced in the various ways disclosed and suggested herein. Such practice shall comprise a part of this invention so long as it comes within the terms of the following claims, as given further meaning by the language of the preceding specification.

What is claimed is:

1. A method for quickly detecting methane in natural gas which includes the steps of
    contacting an enzyme system fraction in immobilized form as a dried dispersion supported by a solid carrier with natural gas and oxygen, said enzyme system fraction being active for methane oxidation and being separated from cells of methane obligate microorganisms and
    promptly reporting the presence of the methane by a signal which is actuated by a response of said enzyme system fraction to the methane prior to onset of hazardous levels of said methane.

2. A method for quickly detecting methane in natural gas as in claim 1, wherein the enzyme system fraction is seperated from cells of methane-obligate microorganisms selected from the class consisting of *Pseudonomas methanica, Methylococcus capsulatus* and *methanomas*.

3. A method for quickly detecting methane in natural gas as in claim 2, wherein said carrie is a paper material with an adsorbent surface for immobilizing said enzyme system fraction.

4. A method for quickly detecting methane in natural gas as in claim 2 wherein said signal is an alarm.

5. A device for quickly detecting methane in natural gas, including
    a solid carrier,
    an enzyme system fraction substantially separated from the cells of a methane obligate microorganism said enzyme system fraction being active for methane oxidation and being immobilized and supported by said carrier as a dried dispersion,
    access means to permit ambient gaseous methane and oxygen to contact said enzyme system fraction, and
    reporting means associated with said enzyme system fraction so that sufficient levels of methane actuates said reporting means to warn of the presence of the ambient methane prior to attainment of hazardous levels thereof.

6. A device for quickly detecting methane in natural gas as in claim 5 wherein said enzyme system fraction is separated from cells of methane-obligate microorganisms selected from the class consisting of *Pseudomonas methanica, Methylococcus capsulatus* and *Methanomas methanooxidans*.

7. A device for quickly detecting methane in natural gas as in claim 6 wherein said reporting means is an alarm which is one of a readily noted visual activity.

8. A device for quickly detecting methane in natural gas as in claim 7 wherein the carrier is a polymer and the alarm includes a color indicator in said polymer.

9. A device for quickly detecting methane in natural gas as in claim 7 wherein the carrier is adsorbent paper, and the alarm is a color indicator in said paper.

References Cited

UNITED STATES PATENTS

| | | | |
|---|---|---|---|
| 3,403,081 | 9/1968 | Rohrback et al. | 195—103.5 R |
| 3,344,037 | 9/1967 | Leavitt | 195—103.5 R |
| 3,326,771 | 6/1967 | Leavitt | 195—103.5 R |
| 2,294,425 | 9/1942 | Sanderson | 195—103.5 P |
| 3,028,313 | 4/1962 | Oberdorfer et al. | 195—103.5 P |
| 3,689,224 | 9/1972 | Agnew et al. | 195—103.5 R |
| 3,099,605 | 7/1963 | Free | 195—103.5 R |

ALVIN E. TANEHOLTZ, Primary Examiner

U.S. Cl. X.R.

195—127, 63.

UNITED STATES PATENT OFFICE
CERTIFICATE OF CORRECTION

Patent No. 3,809,615                Dated May 7, 1974

Inventor(s) D. L. Klass, et al

It is certified that error appears in the above-identified patent and that said Letters Patent are hereby corrected as shown below:

Column 4, line 50, change "bind" to --binding--.
Column 4, line 62, change "gas to" to --gas is to--.
Column 5, lines 66 and 67, delete "is adjusted to a pH of 6.9 with dilute hydrochloric acid, and"
Claim 3, line 2, change "carrie" to --carrier--.

Signed and sealed this 24th day of December 1974.

(SEAL)
Attest:

McCOY M. GIBSON JR.                C. MARSHALL DANN
Attesting Officer                  Commissioner of Patents